Oct. 14, 1924.
T. CARTER
FRICTION SHOCK ABSORBER
Filed Dec. 22, 1922      2 Sheets-Sheet 2
1,511,264
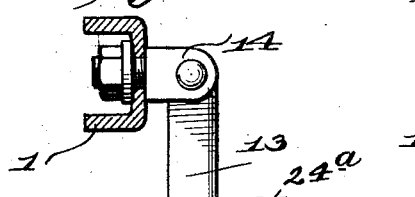
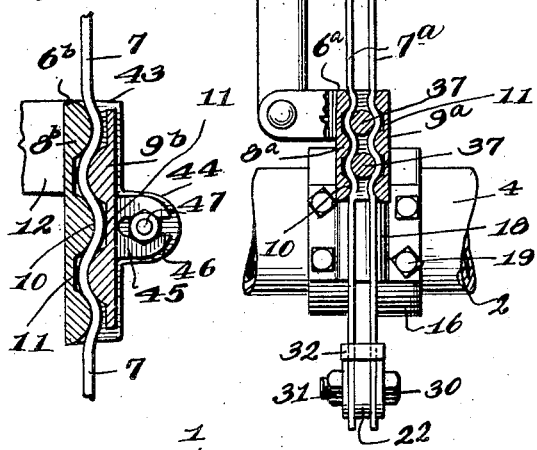
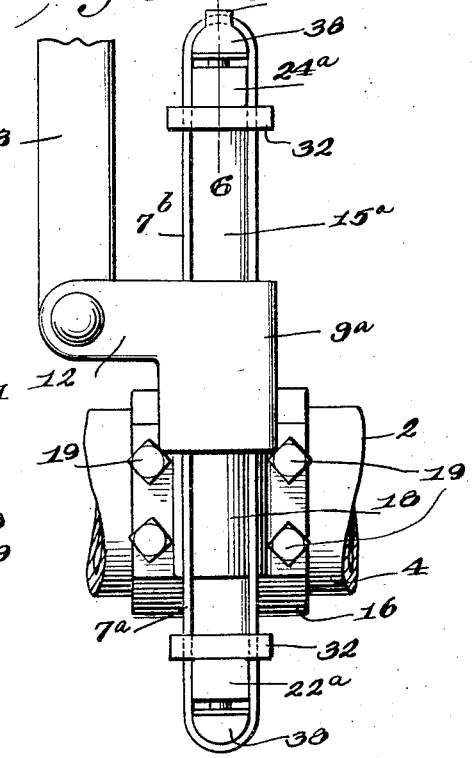
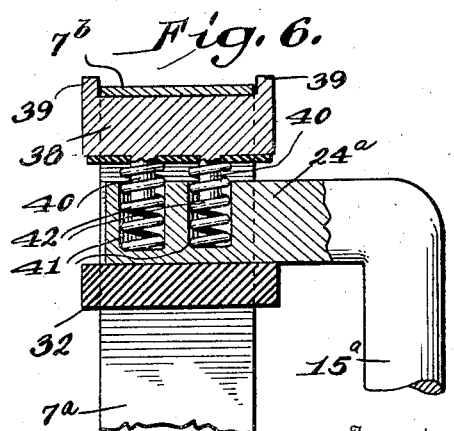
Inventor:
Thomas Carter,
By C. C. Hines
Attorney.

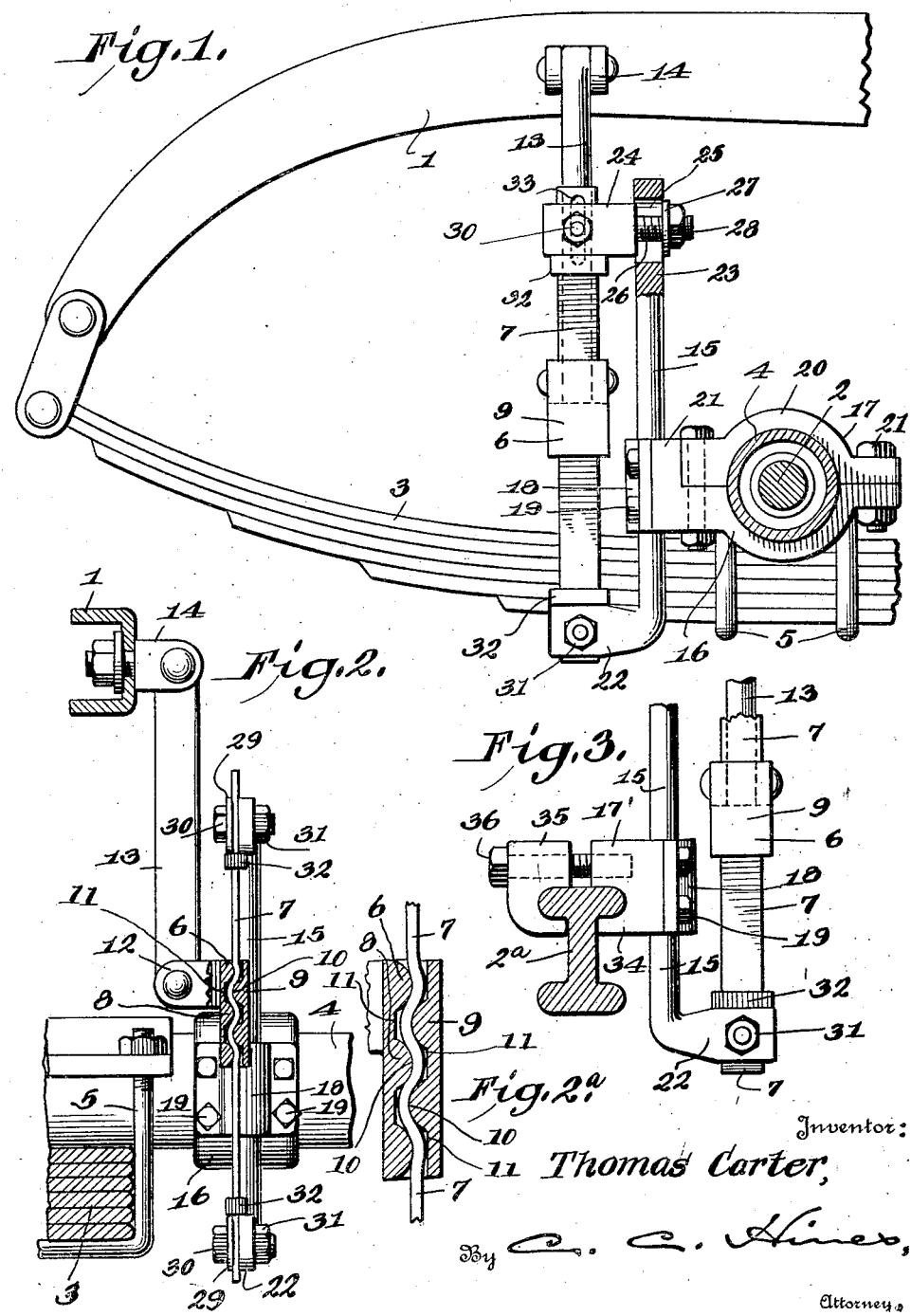

Patented Oct. 14, 1924.

1,511,264

UNITED STATES PATENT OFFICE.

THOMAS CARTER, OF WESTS MILL, NORTH CAROLINA.

FRICTION SHOCK ABSORBER.

Application filed December 22, 1922. Serial No. 608,457.

*To all whom it may concern:*

Be it known that I, THOMAS CARTER, a citizen of the United States, residing at Wests Mill, in the county of Macon and State of North Carolina, have invented new and useful Improvements in Friction Shock Absorbers, of which the following is a specification.

This invention relates to certain new and useful improvements in shock absorbers for use upon automobiles and other vehicles, for the purpose of absorbing and eliminating shocks, jolts and vibrations tending to injure the running gear and other parts of the vehicle and to produce unpleasant and injurious movement of the vehicle body, which shocks, jolts and vibrations are caused by the running of the vehicle over irregularities in the road surface.

One object of the invention is to provide a shock absorber which operates solely by frictional resistance and which dispenses with the use, as motion resistance elements, of springs and other parts whose resistance action is liable to wide and undesirable variations, and which are difficult to adjust and main in proper working position, and which are also liable to easily get out of order.

Another object of the invention is to provide a simple, reliable, inexpensive and efficient type of friction shock absorber which can be easily applied to the vehicle, is not liable to easily get out of order, and which will possess maximum capacity for wear and durability.

Still another object of the invention is to provide a friction shock absorber which is readily and conveniently adjustable to regulate its working resistance to relative movements of parts of the vehicle.

With these and other objects in view, the invention consists of the features of construction, combination and arrangement of parts, hereinafter fully described and claimed, reference being had to the accompanying drawings, in which:—

Figure 1 is a side elevation of the device as mounted upon the rear part of an automobile or like vehicle, parts appearing in section.

Figure 2 is a rear elevation, partly in transverse section, of the parts shown in Figure 1.

Figure 2$^a$ is a sectional view through the friction shoe on an enlarged scale.

Figure 3 is a fragmentary side elevation of the device as applied to the front part of a vehicle of the character described.

Figure 4 is a view similar to Figure 2 showing a modified form of construction.

Figure 5 is a side elevation disclosing a modified development of the structure shown in Figure 4.

Figure 6 is a detail transverse section on line 6—6 of Figure 5.

Figure 7 is a rear elevation showing a modification in the connecting means between the friction shoe and vehicle frame.

Figure 8 is a sectional view showing a modification in the construction of the friction shoe.

Referring now more particularly to Figures 1 and 2 of the drawings, 1 and 2 respectively designate relatively movable members of an automobile or other vehicle, the member 1 constituting a part of the vehicle frame and the member 2 an axle, in this instance a rear axle. The members 1 and 2 are connected in yielding relation, as usual, by means of a spring 3, and the said rear axle member 2 is enclosed, as in the customary manner, in a housing 4 secured to the spring 3 by the clip 5. Figures 1 and 2 show the application of the invention to the rear portion of the frame and the rear axle end of the running gear. In Figure 3 2$^a$ denotes the front axle which constitutes the equivalent of the member 2 in the application of the invention to the front portion of the frame and front axle end of the running gear.

In carrying my invention into practice, I provide a shock absorber comprising two relatively movable friction members 6 and 7 carried by the vehicle members 1 and 2, or 1 and 2$^a$, respectively. The friction member 6 is in the form of a friction shoe and the member 7 is in the form of a flexible band or strap, of leather or other tough and durable material, which is in frictional sliding engagement with the shoe.

The friction shoe 6 consists of a pair of friction jaws 8 and 9, arranged to bear upon the opposite sides of the friction strap 7, each of said jaws being provided on its inner face with a corrugated surface formed of spaced ribs 10 and intervening recesses 11. The ribs and recesses of the respective jaws 8 and 9 are arranged in staggered relation, or in alternation with each other, the rib of one jaw being disposed opposite a recess in the other jaw. The jaws 8 and 9 are suitably connected together and are preferably held in definite fixed relationship, and the ribs and recesses thereof form a serpentine-shaped passage through which the strap 7 extends, and which at the points where the strap is held between the rounded surfaces of adjacent ribs is of a width not exceeding the width of the strap. The jaw 8 is provided with an inwardly extending lug 12 which is pivotally coupled by a hanger bar or link 13 with a bracket lug 14 bolted to the frame member 1. By this means the shoe 6 is supported from the frame for sliding movements upon and relative to the strap 7, in the relative up and down movement of the relatively movable members 1 and 2 of the vehicle.

The strap 7 is supported by a bracket 15 in the form of a yoke rod. The body portion of this bracket passes through recesses formed in the body portion of one member 16 of a double clamp 17 and a clamping plate 18 secured to said member 16 by bolts or other fastenings 19. The clamp 17 includes also a member 20, the said members 16 and 20 being formed to embrace the axle housing 4 and secured thereto by bolts or other suitable fastening members 21. The bracket member 15 is thus supported upon the housing of the rear axle and held rigidly in position by the double clamp 17. By relaxing the bolts or fastenings 19, the bracket 15 may be adjusted up and down and then fixed in adjusted position by tightening said bolts or fastening members 19, such adjustment adapting the strap 7 to be disposed at a proper working elevation, or to regulate its position as required in the relative arrangement of the members 1 and 2 in different makes or types of vehicles.

At its lower end the bracket rod 15 is provided with a rearwardly extended flattened arm 22, and at its upper end said bracket rod is formed with a flattened portion 23 extending transversely of the vehicle. Carried by this portion 23 is an arm 24 arranged above and in alinement with the arm 22. The arm 23 is formed with a slot 25 receiving a bolt 26 on the arm 24 which extends therethrough and is fitted with a washer 27 and a nut 28, whereby the arm 24 may be fixed in position on the rod 15. The respective ends of the strap 7 are arranged to bear against the inner faces of the arms 22 and 24 and are clamped between said arms and washers 29 secured in position by bolts 30 and nuts 31 applied thereto, whereby the strap 7 is held extended between the arms 22 and 24 for working engagement with the shoe 6 which engages the body of the strap and is relatively movable thereon substantially throughout the distance between the said arms 22 and 24. Buffers 32 of rubber or other suitable material may be arranged upon the arms 22 and 24 for engagement by the shoe 6 at the limits of its up and down strokes, so as to cushion the action and prevent direct contact between the shoe and the arms 22 and 24.

It will be observed that the strap 7 is of definite working length, regulated by the distance in the length of the strap between the buffers 32 for the working movement of the shoe 6 on said strap. The portion of the strap which passes between the jaws 8 and 9 of the shoe engages the rounded surfaces of the ribs 10 and is forced more or less by said ribs into the recesses 11, the enclosed portion of the strap thus being fluted or corrugated and caused to travel, in the relative up and down movements of the strap and shoe, in a corrugated path, whereby a frictional resistance to the relative movements of the shoe and strap is instituted. The strap is always taut, and the resistance noted is always constant, and may vary in degree only proportionate to the tautness of the strap, its degree of projection into the recesses 11 and the extent of its frictional binding engagement with the curved faces of the ribs 10. While the strap is essentially taut, it will be understood that its fluted portion held between jaws 8 and 9 constitutes a slightly slack portion, due to the deflection of its fluted portions from the normal plane of the strap. By adjusting the arm 24 in the slot 25 of bracket rod 15, the degree of tautness of the strap 7 may be increased or decreased within certain limits. When the strap is relaxed to decrease its tautness, the fluted portions thereof are free to move to a greater extent into the recesses 11, and away from the curved surfaces of the ribs 10, as the strap slides between the jaws 9, as a result of which the strap may slide more freely between the jaws, thus reducing the amount of frictional resistance to the relative sliding movements of the shoe 6 and strap 7 on each other. This will accordingly allow greater relative freedom of motion between the relatively movable parts 1 and 2 of the vehicle. When the strap 7 is drawn to a greater degree of tautness, however, by which its fluted portion is to an extent straightened out, the slackness of the fluted portion is decreased and the convolutions of such portion can not therefore sink to any material degree in the recesses 11, and hence are caused to bind more firmly against the curved faces of the ribs 11, by which the frictional resistance to the relative movements of the shoe and strap on one another is increased, and the extent of this increase in the frictional resistance may be regulated to any degree desired by upward adjustment of the arm 24 on the bracket rod 15. It will be understood from this that the frictional action of the parts 6 and 7 on one another may be regulated in a very simple and easy manner according to the size and weight of the automobile, and the weight of the load thereon, to control and cushion the relative movements of the relatively movable parts 1 and 2 of the vehicle to any degree desired for shock absorbing actions. As shown in the present instance, the upper end of the strap may be formed with a slot 33 through which the bolt 30 passes, and which will permit adjustment of the strap per se for the purposes stated without adjusting the arm 24, or which allows adjustment of both the strap per se and the arm 24, to regulate the degree of tautness of the strap and frictional binding engagement of the shoe 6 and strap 7 on one another. Either one or both of these adjustments may be employed as desired or required to suit different conditions of service.

In the application of the device to each side of the vehicle between the frame member 1 and the housing 4 of the adjacent end or section of the rear axle 2, the parts are mounted in the manner described and as particularly shown in Figures 1 and 2, from which it will be seen that the friction shoe 6 will be supported by the frame member 1 and friction strap 7 by the running gear member 2, and that said parts 6 and 7 are therefore arranged to have frictional up and down sliding engagement with each other in the up and down movements of the parts 1 and 2. Hence the frictional engagement of the members 6 and 7 will resist downward movement of the member 1 and upward movement of the member 2, or conjoint movements of said members in such directions, the frictional resistance being substantially equal or uniform in both directions, thus giving a very highly reliable and efficient shock absorbing action in both directions for the running gear as well as shock absorbing actions in both directions for the frame and body of the vehicle. Hence, it will be understood, that the strap may slide through the friction shoe for a shock absorbing action, and the friction shoe may slide along the strap for a shock absorbing action, or both friction members may have conjoint sliding motion in opposite directions, thus not only checking any undue motion and vibration of the axle 2 and spring 3, but also checking any undue motion or vibration of the frame 1 and the car body, whereby ample resiliency of the running gear is permitted while undue shocks, jolts and vibrations are prevented and absorbed in the travel of the vehicle over the roughest streets and roadways. Comfort in riding is thus ensured and wear and tear on the parts of the vehicle, and liability of fractures prevented or reduced to the minimum. It will be observed that as the shoe 6 is flexibly supported by the swinging link 13, both the shoe and strap are permitted to have lateral or sidewise motion to a limited degree to compensate for relative lateral or sidewise movements of the running gear and vehicle frame or body, while instituting a yielding resistance to such motions, thus further reducing liability of breakage of parts and increasing the shock absorbing efficiency of the device.

While the jaws 8 and 9 of the friction shoe 6 may be made relatively adjustable, to regulate their frictional pressure on the strap 7, as hereinafter described, it will be observed that said jaws 8 and 9 are relatively fixed as to position in working action, and also that, for this reason, the fluted slack portion of the strap 7 is of relatively small linear degree or extent proportionate to the length of the strap. Hence the strap is always held taut in action between the jaws, but its degree of tautness may be adjusted, through the adjusting means described, to a certain extent to regulate the degree of binding contact of the strap against the curved faces of the ribs 10 in the serpentine channel of fixed width between the jaws 8 and 9 of the shoe 6, by means of which the frictional resistance of movement of the shoe and strap on one another may be regulated and controlled without leaving any undesirable slack portions in the strap liable, under sudden motions of the vehicle, to cause snapping of the strap or lack of control at any time and resulting damage to other parts of the shock absorber through unrestrained movements of the parts of the vehicle designed to be controlled thereby, This furthermore allows substantially equal and uniform resistance to both up and down movements of the parts of the vehicle, without resort to the use of relatively movable jaws, or of slack take up actions in the strap as a part of the shock absorbing action, or of the use of springs or other parts of uncertain character and liable to get out of order or to cause trouble or complication. I thus provide for securing maximum efficiency of action by the use of a shock absorber of friction type of the simplest possible construction and which may be manufactured, installed and kept in working order at comparatively low cost.

In Figure 3 I have shown the mode of application of the shock absorber when employed at the front of the vehicle. When so employed it will be understood that the shoe 6 may be mounted upon the front part of the frame as shown in Figures 1 and 2 or in any other manner hereinafter described, while the strap 7 is supported from the front axle 2$^a$ of the vehicle. For this purpose a clamp 17' is employed which holds the bracket rod 15 in the manner previously described, and which comprises two members 34 and 35 suitably formed to engage said axle and united and clamped thereto by screws 36.

In Figure 4 I have shown a modified construction of shock absorber embodying the general principles of my invention, and which is adapted for light, medium and heavy weight cars, but particularly desirable for use upon cars of the heavier weights. In this construction two opposite parallel friction strap members 7ª are employed, which pass through the shoe 6ª between the jaws 8ª and 9ª and are held in spaced relation by rounded friction studs 37. As shown, each strap is disposed between one of the jaws and the studs 37, and the friction ribs and recesses of these jaws are arranged opposite each other, while the studs 37 are disposed in alinement with the alined recesses, said studs serving the function of intermediate ribs for pressing the strap members against the ribs and into the recesses of the coacting jaws. The strap members thus run in contact with the opposed sets of frictional surfaces, forming corrugations in the length of each strap stretch as in the construction and for the same purpose as that previously described with reference to the construction shown in Figures 1 and 2. Figures 5 and 6 show a further modification using the friction jaws and studs as shown in Figure 4 in which the ends of the strap members are joined to form a looped strap 7ᵇ. The hanger rod or bracket 15ª in this construction shown in Figures 5 and 6 is provided with integral arms 22ª and 24ª, and arranged for cooperation therewith are supporting and cushioning blocks 38 around which the ends or bight portions of the strap 7ª pass, said strap portions being held from displacement by guard flanges 39. The outer surfaces of the blocks 38 around which the strap passes are properly rounded, and said blocks are provided upon their inner surfaces with guide pins or studs 40 entering guide sockets or recesses 41 in the arms 22ª and 24ª, in which sockets or recesses are disposed coiled springs 42 against which the blocks 38 bear and which surround the pins or studs 40. By this construction the blocks are spring supported and pressed outwardly to hold the band 7ª normally taut, while said blocks are permitted to yield against the resistance of their pressure springs to absorb sudden shocks or jerks falling upon the strap, to proprly cushion the same in its working action and thereby increase the shock absorbing efficiency, while at the same time preventing liability of damage to the strap or other working parts of the absorber as a result of sudden shocks or strains falling thereon. This type of the device provides a very strong and durable, double-friction construction of shock absorber which may be employed upon cars of all weights, but which is especially desirable for use in connection with large cars, trucks and other heavy vehicles.

As hereinbefore set forth, the jaws of the friction shoe are relatively fixed when in working relationship, and may be absolutely fixed against movement towards and from each other. I may, however, provide means for relatively adjusting the jaws for the purpose of varying their frictional pressure on the friction strap. Figure 8 shows one form of construction for this purpose. In this construction one of the jaws, as the inner jaw 8ᵇ, is provided with a flange or extension 43 carrying a lug 44, while the outer jaw 9ᵇ is provided with a lug 45 having a slot 46, said slot receiving a bolt or other fastening 47 carried by the lug 44, whereby the jaw 9ᵇ may be adjusted relatively to the jaw 8ᵇ to vary the distance between them and fastened in adjusted position by means of the bolt nut. As a result of this construction, the distance between the jaws may be varied whenever it is desired to compensate for wear upon the belt, or to increase or diminish the frictional pressure of the jaws upon the belt, but when so adjusted the jaws remain fixed in adjusted position and working relationship, that is, have no working movement toward and from each other in the cooperative friction and shock absorbing action of the shoe and strap.

In Figure 7 I have shown another modified form of the invention which may be employed in some cases. In this modification the hanger 13ª is in the form of a rigid arm integrally or otherwise fixedly connected at its lower end with the friction shoe 6 and bolted or otherwise rigidly fastened as at 48 to the frame member 1. This construction may be used whenever it is found not necessary to flexibly support the friction shoe for lateral movements, as in the construction shown in Figures 1 and 2.

From the foregoing description, taken in connection with the drawings, the construction and mode of operation of my improved shock absorbing device will be readily understood, and it will be seen that the invention provides a friction shock absorber consisting of only two main working parts, to wit, the friction shoe 6 and friction strap 7, or their equivalent shown, and that great simplicity and efficiency is secured by the novel and peculiar formation of the friction shoe and its action upon the friction strap, by means of which a frictional resistance in both directions of movement is secured to control and institute a shock absorbing action which will reduce to the minimum undue independent or conjoint up and down movements of the running gear and frame of the vehicle and the injurious and unpleasant riding motions caused thereby. Also it will be seen that the invention provides a construction of shock absorber which may be manufactured and installed and maintained in working condition at a comparatively low cost, as it entirely dispenses with the use of springs and other cumbersome or unreliable elements which require constant care and attention and are liable at all times to get out of order. Furthermore, it will be seen that the invention may be applied for use with like efficiency at both the front and rear of an automobile or other similar vehicle.

In practice, any suitable means may be provided for shielding and protecting the band and shoe, and their supports, or a part of them, from dirt, dust or other flying particles, or injury by contact with extraneous objects.

While the construction disclosed constitutes the preferred embodiment of the invention, it will, of course, be understood that many changes in form, construction and arrangement of parts may be made within the scope of the appended claims without departing from the spirit or sacrificing any of the advantages of the invention.

Having thus fully described my invention, I claim:

1. In a shock absorber for vehicles having frame and axle members, a support carried by one of said members, a substantially straight flexible friction strap attached at its ends to said support, a second support carried by the other member, and a friction shoe carried by said second support and slidably engaging the strap between the points of attachment of the latter to its support.

2. In a shock absorber for vehicles having frame and axle members, a support carried solely by the axle member, a substantially straight flexible friction strap carried by and terminally attached to said support, a second support carried solely by the frame member, and a friction shoe carried by said second support and slidably engaging the strap between the points of attachment of the latter to its support.

3. In a shock absorber for vehicles having frame and axle members, a support carried by and extending above and below the horizontal plane of the axle member, a vertically disposed flexible friction band carried by said support and terminally attached thereto, a second support depending from the frame member, and a friction shoe carried by said second support and slidably engaging the band between the points of attachment of the latter to its support.

4. In a shock absorber for vehicles having frame and axle members, a vertically disposed bracket carried by the axle member and having laterally projecting arms, a flexible strap carried solely by said bracket and terminally attached to said arms, a second support depending from the frame member, and a friction shoe carried by said second support and slidably engaging the strap between the laterally disposed arms of the bracket.

5. In a shock absorber for vehicles having frame and axle members, a vertically disposed bracket carried by the axle member and extending above and below the horizontal plane thereof, said bracket having laterally disposed upper and lower arms, a flexible friction strap solely carried by the bracket and attached at its end to said arms, a support depending from the frame member, and a friction shoe carried by said support and slidably engaging the friction strap between the laterally disposed arms of the bracket.

6. In a shock absorber adapted for connection with a vehicle frame member, and an axle, the combination of an upright support carried by the axle and having horizontally projecting arms, a flexible friction band extended between and attached to said arms, a friction shoe slidably engaging said strap between said arms, and a support for said shoe flexibly connecting the same with the frame member.

7. In a shock absorber adapted for connection with a vehicle frame member, and an axle, the combination of a support carried by the axle, a flexible friction band terminally attached to said support, a second support pivoted to and depending from the frame member, and a friction shoe pivoted to said second support and slidably engaging the friction band between the secured ends thereof.

8. In a shock absorber adapted for connection with a vehicle frame member, and an axle, the combination of a rigid support carried by the axle, a flexible friction band attached at each end to said support, a friction shoe embodying members slidably engaging said band, and a support depending from the frame member and flexibly connecting the friction shoe therewith.

9. In a shock absorber adapted for connection with a vehicle frame member, and an axle, the combination of a support carried by the axle, a friction band carried by said support, a friction shoe slidably engaging said band, and a pivoted hanger depending from the support and flexibly connecting the shoe therewith.

10. A shock absorber adapted for connection with two relatively movable members, the movements of which are to be cushioned, said absorber including a flexible strap extending substantially in a continuous plane from end to end thereof, means, carried by one of said members, for supporting the strap from said member, said strap being attached at its extremities to said supporting means and held extended under tension thereby, and a friction shoe carried by the other member and slidable on and in frictional contact with said tensioned strap.

11. In a shock absorber adapted for connection with a vehicle frame member, and an axle, the combination of a continuously straight, vertically disposed flexible non-self-sustaining friction strap, means, to which the ends of said strap are attached, for supporting the strap in extended condition supported solely from the axle and free from connection with the frame member, and a friction shoe carried by and depending from the frame member and slidably engaging said strap between its point of attachment to said supporting means.

12. In a shock absorber adapted for connection with a vehicle frame member, and an axle, the combination of a continuously straight, vertically disposed friction strap extending above and below the horizontal plane of the axle, a rigid support fastened to the axle and carrying said strap and to which the ends of the strap are connected, and a friction shoe carried by and depending from the frame member and in sliding frictional engagement with said strap between its points of attachment to said support.

13. In a shock absorber adapted for connection with a vehicle frame member, and an axle, the combination of a yoke bracket secured to the axle, a vertically disposed linear friction strap terminally secured to the ends of said bracket, a hanger depending from the frame member, and a friction shoe carried by said hanger and slidably engaging said strap between its points of attachment to the ends of the yoke bracket.

14. In a shock absorber adapted for connection with a vehicle frame member, and an axle, the combination of an upright secured to the axle and having upper and lower horizontal arms, a vertically disposed friction strap stretched between and terminally secured to said arms, a hanger depending from the frame member, and a friction shoe carried by said hanger and slidably engaging said strap between said arms.

15. In a shock absorber adapted for connection with a vehicle frame member, and an axle, the combination of a rigid support fastened to the axle, a vertically disposed friction strap extending linearly between and fastened at its ends to parts of said support, and a friction shoe slidably engaging the strap between its points of attachment to said support, said shoe being pivotally supported from the frame member.

16. In a shock absorber adapted for connection with a vehicle frame member, and an axle, the combination of an upright rigid support carried by the axle and having terminal portions, a vertically disposed friction strap extending linearly between and attached at its ends to said terminal portions of said upright support, and a friction shoe carried by the frame member and depending therefrom and slidably engaging said strap between the terminals of the upright support.

17. In a shock absorber adapted for connection with a vehicle frame member, and an axle member, the combination of a flexible non-resilient and non-self-sustaining friction band held under tension in extended condition and wholly carried by one member, and a friction shoe wholly carried by the other member, independent of the band, and slidably engaging said band.

18. In a shock absorber adapted for connection with two vehicle parts, the relative movements of which are to be cushioned, the combination of a bow-shaped support on one vehicle part, a friction strap held stretched between the terminals of said support, and a friction shoe on the other vehicle part slidably engaging the strap between the said terminals of said bow-shaped support.

19. In a shock absorber adapted for connection with two vehicle parts, the relative movements of which are to be cushioned, the combination of a support on one of the vehicle parts, a substantially straight friction band attached at each end to the support and held stretched under substantially constant tension by said support, a sliding shoe on the other vehicle part having opposed normally fixed friction surfaces engaging said band between its points of attachment to the support, and means for varying the frictional pressure of said friction surfaces on said band.

20. In a shock absorber adapted for connection with two vehicle parts, the relative movements of which are to be cushioned, the combination of a support on one of the vehicle parts, a substantially straight friction band attached at each end to the support and held stretched under substantially constant tension by said support, a sliding shoe on the other vehicle part having opposed normally fixed non-rotatable friction surfaces engaging said band, and means for varying the tension of said band and the frictional pressure of said friction surfaces on said band.

21. In a shock absorber for vehicles, a support, a friction band terminally attached to and held under substantially constant tension by said support, and a sliding friction shoe comprising jaws arranged on opposite sides of the band, said jaws having corrugated friction surfaces normally fixed in working relationship to each other and forming constant corrugated deflections in the band.

22. In a shock absorber for vehicles, a support, a friction band terminally attached to and held under substantially constant tension by said support, and a sliding friction shoe comprising jaws arranged on opposite sides of the band, said jaws having corrugated friction surfaces normally fixed in working relationship to each other and forming constant corrugated deflections in the band, and means independent of said shoe for varying the tension of said band and its capacity for flexion between said corrugated friction surfaces.

In testimony whereof I affix my signature.

THOMAS CARTER.